(12) United States Patent
Ye et al.

(10) Patent No.: US 11,971,137 B2
(45) Date of Patent: Apr. 30, 2024

(54) LIGHTWEIGHT HAND-HELD STABILIZER

(71) Applicant: GUILIN ZHISHEN INFORMATION TECHNOLOGY CO., LTD., Guilin (CN)

(72) Inventors: Zilong Ye, Guilin (CN); Xiao Su, Guilin (CN); Anquan Pan, Guilin (CN); Yilun Liao, Guangxi (CN); Chengpeng Guo, Guilin (CN); Bangming Zheng, Guilin (CN); Caner Wu, Guilin (CN); Xin Wang, Guilin (CN)

(73) Assignee: GUILIN ZHISHEN INFORMATION TECHNOLOGY CO., LTD, Guangxi (CN)

( * ) Notice: Subject to any disclaimer, the term of this patent is extended or adjusted under 35 U.S.C. 154(b) by 429 days.

(21) Appl. No.: 16/972,999

(22) PCT Filed: Aug. 21, 2019

(86) PCT No.: PCT/CN2019/101746
§ 371 (c)(1),
(2) Date: Dec. 7, 2020

(87) PCT Pub. No.: WO2020/038396
PCT Pub. Date: Feb. 27, 2020

(65) Prior Publication Data
US 2021/0254786 A1    Aug. 19, 2021

(30) Foreign Application Priority Data

Aug. 21, 2018  (CN) .................. 201810956968.X

(51) Int. Cl.
*F16M 13/04* (2006.01)
*F16M 11/20* (2006.01)
(Continued)

(52) U.S. Cl.
CPC ........ *F16M 13/04* (2013.01); *F16M 11/2042* (2013.01); *F16M 13/06* (2013.01); *G03B 17/561* (2013.01); *H02K 11/21* (2016.01)

(58) Field of Classification Search
CPC .... F16M 13/04; F16M 13/06; F16M 2200/08; F16M 11/2042; F16M 11/205;
(Continued)

(56) References Cited

U.S. PATENT DOCUMENTS

2005/0258660 A1   11/2005  Wu
2016/0381271 A1*  12/2016  Cheng ............... F16M 13/04
                                                      348/208.2

FOREIGN PATENT DOCUMENTS

CN    106090551 A  * 11/2016
CN    108799801 A    11/2018
(Continued)

OTHER PUBLICATIONS

Supplementary European Search Report for EP Application No. 19851893.8 dated Apr. 29, 2022 (6 pages).
(Continued)

*Primary Examiner* — Clayton E. LaBalle
*Assistant Examiner* — Fang-Chi Chang
(74) *Attorney, Agent, or Firm* — Rimon PC; Zhun Lu

(57) ABSTRACT

The invention provides a lightweight hand-held stabilizer comprising a gimbal and a 7-shaped handle. The 7-shaped handle comprises a first connection arm (1) and a second connection arm (2), one end of the first connection arm (1) is rigidly connected to one end of the second connection arm (2), and a movable connector(s) is arranged at the end face of the other end of the first connection arm (1) and/or the second connection arm (2). The present invention can provide multiple using modes of the stabilizer handle, and the user experience of a stabilizer product is enhanced.

7 Claims, 7 Drawing Sheets

(51) Int. Cl.
*F16M 13/06* (2006.01)
*G03B 17/56* (2021.01)
*H02K 11/21* (2016.01)

(58) Field of Classification Search
CPC .. F16M 11/121; F16M 11/123; G03B 17/561; G03B 17/563; H02K 11/21
See application file for complete search history.

(56) References Cited

FOREIGN PATENT DOCUMENTS

| | | | |
|---|---|---|---|
| CN | 108826001 | A | 11/2018 |
| CN | 108930900 | A | 12/2018 |
| FR | 3042580 | A1 | 4/2017 |
| GB | 2521865 | A | 7/2015 |
| KR | 101667394 | B1 * | 10/2016 |
| WO | 2015165022 | A1 | 11/2015 |

OTHER PUBLICATIONS

Intenrationl Search Report for PCT/CN2019/101746 dated Nov. 7, 2019.
Written Opinion of the Intenrationl Searching Authority for PCT/CN2019/101746 dated Nov. 7, 2019.

* cited by examiner

LIGHTWEIGHT HAND-HELD STABILIZER

CROSS-REFERENCE TO RELATED APPLICATIONS

This application is a national stage application (under 35 U.S.C. § 371) of PCT/CN2019/101746, filed Aug. 21, 2019, which claims benefit of Chinese Application No. 201810956968.X, filed Aug. 21, 2018, both of which are incorporated herein by reference in their entirety.

TECHNICAL FIELD

The invention relates to the technical field of the gimbal, in particular to a lightweight hand-held stabilizer.

BACKGROUND OF THE DISCLOSURE

Most of the existing handles for the hand-held gimbal stabilizer have the configuration of traditional straight-rod, which comprises an elongated column as well as an arrangement for mounting the camera and adjusting the gravity center, a handle and a counterweight which are arranged on the column from top to bottom. The self-weight of the stabilizer is heavy, and thus it will become much heavier after a camera is arranged thereon. While in the prior art the hand-held handles are either placed horizontally or vertically, the ways for holding the hand-held handles cannot be changed so as to meet the needs of the user, and in view of this the tired or fatigued sense raised by holding the handles in a single way cannot be reduced. Therefore, the current hand-held camera stabilizer will be greatly limited in its popularization and application.

SUMMARY OF THE DISCLOSURE

In view of the problems existing in the prior art, the invention provides a lightweight hand-held stabilizer, which increases the application modes of the stabilizer handle and enhances the experience of the stabilizer product for user. In order to achieve the object of the invention, the lightweight hand-held stabilizer provided by the invention is realized by the following technical scheme.

A lightweight hand-held stabilizer, comprising a gimbal and a 7-shaped handle, the handle comprises a first connection arm and a second connection arm, one end of the first connection arm is rigidly connected to one end of the second connection arm, a gimbal connector is arranged at the end of the joint of the first connection arm and the second connection arm, and the first connection arm is used for being hand-held and control device is provided on the first connection arm.

Further, a movable connector is arranged on the end face of the other end of the first connection arm and the second connection arm.

Further, the second connection arm is provided with a battery compartment.

Further, an included angle of 60 to 120 degree is formed between the first connection arm and the second connection arm.

Further, an included angle of 0 to 90 degree is formed between an axial direction of the end face of the movable connector of the second connection arm and an axial direction of the second connection arm.

Further, the movable connector is designed to couple the handle of the stabilizer to a support or an extension hand-held part.

Further, the movable connection is designed to be one of bolt connection, snap connection and magnetic connection.

Further, the gimbal includes a loading stand, connection arms and motors, wherein the loading stand is connected to the motor by the connection arm, and the motor is fixed at the end that connecting the gimbal with the handle.

Further, the motor includes a magnet, a motor drive plate and a motor shaft; the magnet is arranged on one end of the motor shaft; the motor drive plate is arranged around the magnet, and a gap is left between the magnet and the motor drive plate.

Further, the motor drive plate is provided with an encoder, the median plane of the encoder is coplanar with that of the magnet.

The advantages of the invention are as follows: 1. the user experience can be further optimized; 2. there are various application modes provided for the users to choose; 3. a various of application modes can be switched in order to make the gimbal operation more labor-saving; 4. the encoder and the motor drive plate are sleeved around the cylindrical surface of the magnet, which replaces the construction that the encoder is installed on the top of the magnet in the prior art, thereby the thickness of motor is greatly reduced and the overall weight of stabilizer is lightened without changing the motor power or parameters.

Figure 1:
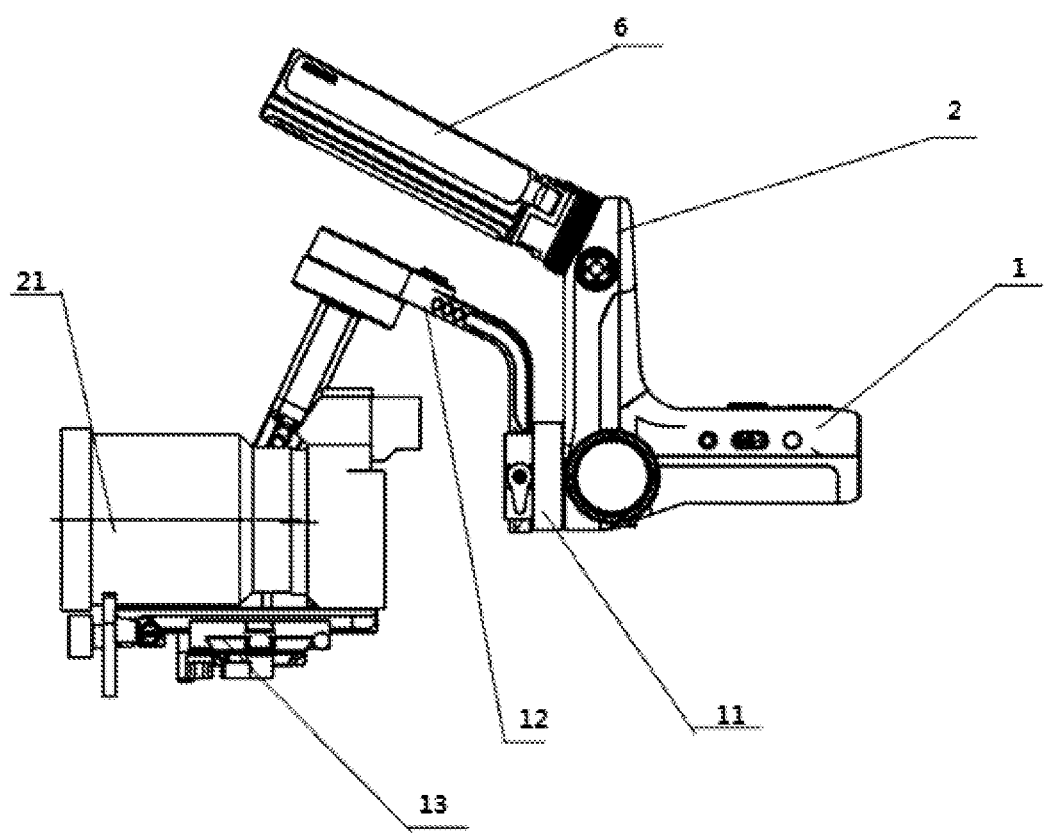
FIG. 1 is an overall structure of the lightweight hand-held stabilizer according to the present invention.

In the drawings, 1. the first connection arm; 2. the second connection arm; 3. gimbal connector; 4. movable connector; 6. extension hand-held part; 5. support; 7. battery compartment; 11. motor; 12. connection arm; 13. loading stand; 21. camera; 14. magnet; 15. motor drive plate; 16. motor shaft; 17. motor core carrier; 18. bearing; 19. motor end cover; 20. motor core; 22. motor housing; 23. encoder.

DETAILED DESCRIPTION OF THE DISCLOSURE

In order to explain the technical content, the objects and effects of the present invention in detail, the following will be described in conjunction with embodiments and drawings.

Embodiment 1

Figure 2:
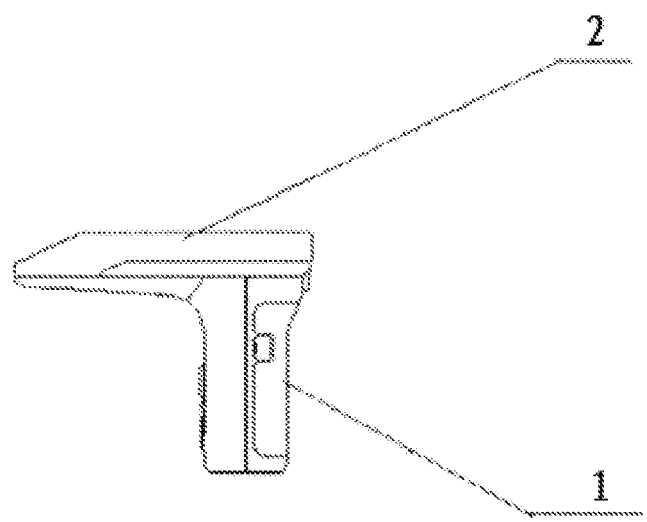
FIG. 2 is a structure diagram of the 7-shaped handle according to the present invention.

This embodiment provides a lightweight hand-held stabilizer, as shown in FIG. 1, which includes a gimbal and a 7-shaped handle (7 refers to an Arabic number 7), wherein the gimbal includes a loading stand 13, connection arms 12 and motors 11, a camera 21 is mounted on the loading stand 13, the connection arm 12 connects the connection arm 12 to the motor 11, and the motor 11 is arranged on a gimbal connector 3 of the 7-shaped handle. The 7-shaped handle, as shown in FIG. 1 or 2, comprises a first connection arm 1 and a second connection arm 2, wherein one end of the first connection arm 1 is rigidly connected to one end of the second connection arm 2. Compared with the existing stabilizer handle with the configuration of straight-rod, the first connection arm and the second connection arm will intersect with each other, so that the stabilizer is not limited to be held vertically, it is also allowable to hold the stabilizer in the horizontal direction. As two holding modes can be provided for the user to choose, the user experience is improved and the fatigued feeling raised by holding the stabilizer in a single way for a long time is further reduced.

Embodiment 2

Figure 3:
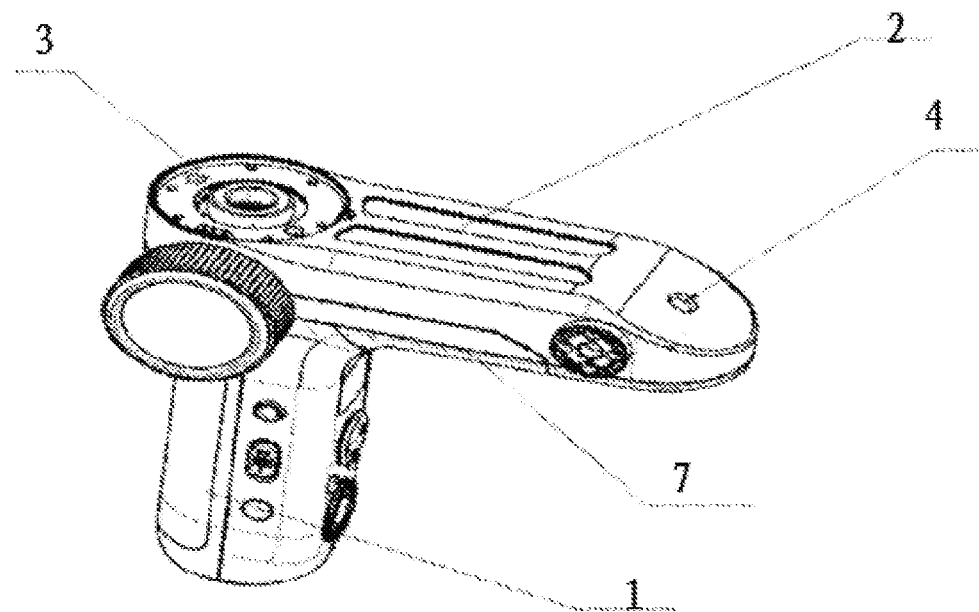
FIG. 3 is a structure diagram of a 7-shaped handle with a movable connector provided at the end of the handle according to the present invention.

On the basis of the embodiment 1, as shown in FIG. 3, a movable connector 4 is provided at the other end of the first connection arm 1, in order to couple with the extension hand-held part 6 shown in FIG. 3.

Embodiment 3

Figure 4:
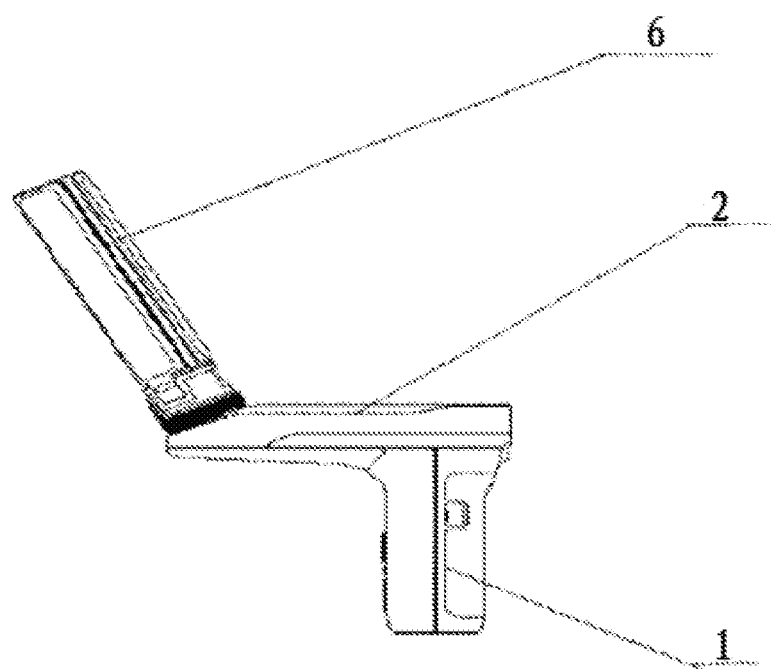
FIG. 4 is a structure diagram of a 7-shaped handle with an extension hand-held part connected to the end of the handle according to the present invention.
Figure 5:
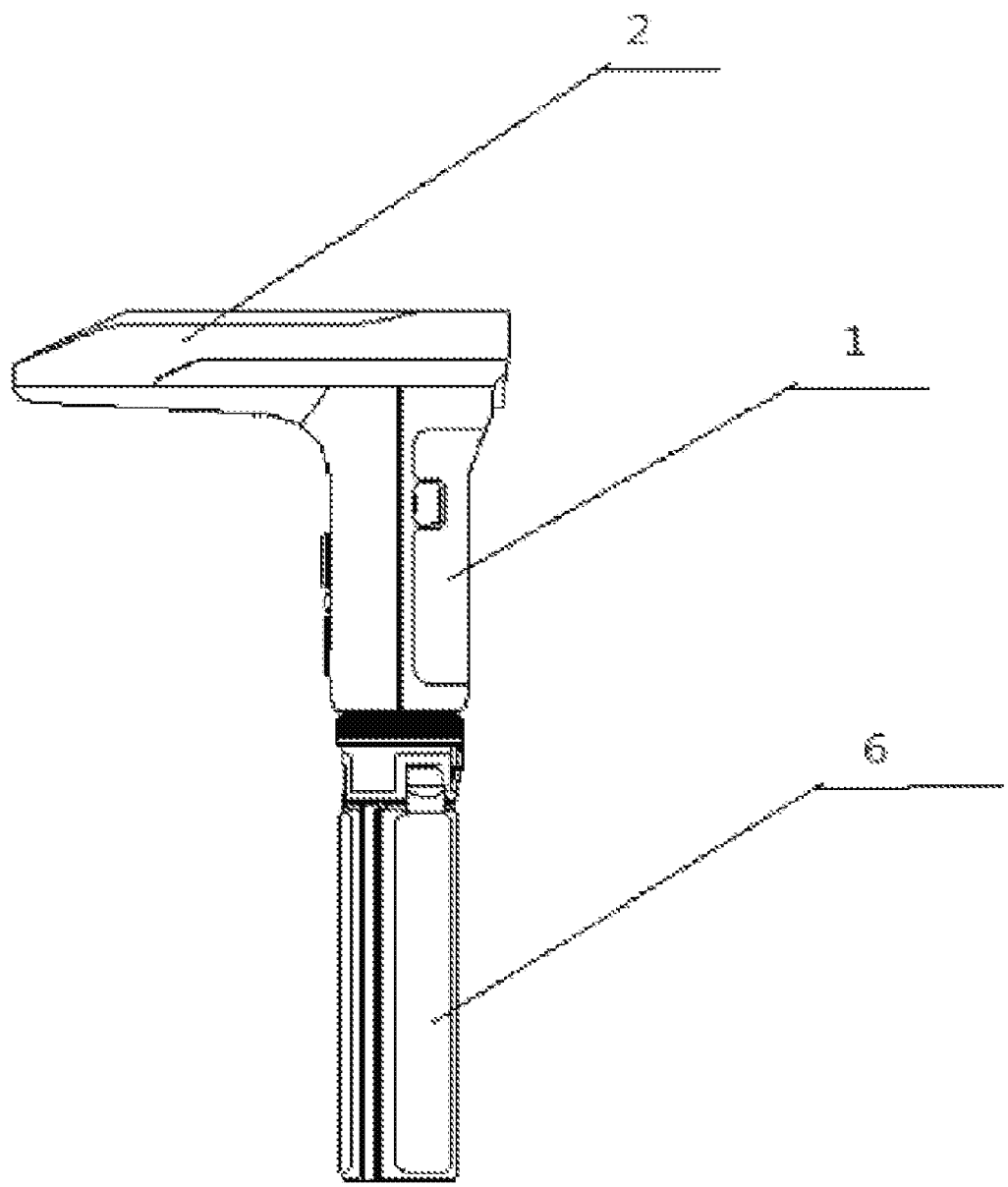
FIG. 5 is a another structure diagram of a 7-shaped handle with an extension hand-held part connected to the end of the handle according to the present invention.

On the basis of the embodiment 1, as shown in FIG. 5, a movable connector 4 is provided at the end face of the other end of the second connection arm 2, in order to couplet with extension devices, such as the extension hand-held part 6 shown in FIG. 4 or the support 5 shown in FIG. 5.

Embodiment 4

On the basis of the embodiment 1, as shown in FIG. 3, a gimbal connector 3 is provided at the end of the joint of the first connection arm 1 and the second connection arm 2, and the first connection arm is used for being hand-held, control devices can be provided thereon. It is convenient for the user to install the gimbal, hold the handle and control the control device on the side of the handle.

Embodiment 5

On the basis of the embodiment 1, as shown in FIG. 3, the second connection arm 2 is provided with a battery compartment 7, which is used for accommodating and clamping the battery needed by the hand-held stabilizer.

Embodiment 5

The embodiment 1, as shown in FIG. 2, exemplarily shows that an included angle of 90 degrees is formed between the first connection arm 1 and the second connection arm 2. However, according to other embodiments of the present invention, as an alternative, other included angles for example of 60-120 degree can also be formed between the first and the second connection arm, which can also reach the goal of this invention. The included angles mentioned above will facilitate the users to adjust the gravity center when switching the holding modes.

Embodiment 6

Figure 7:
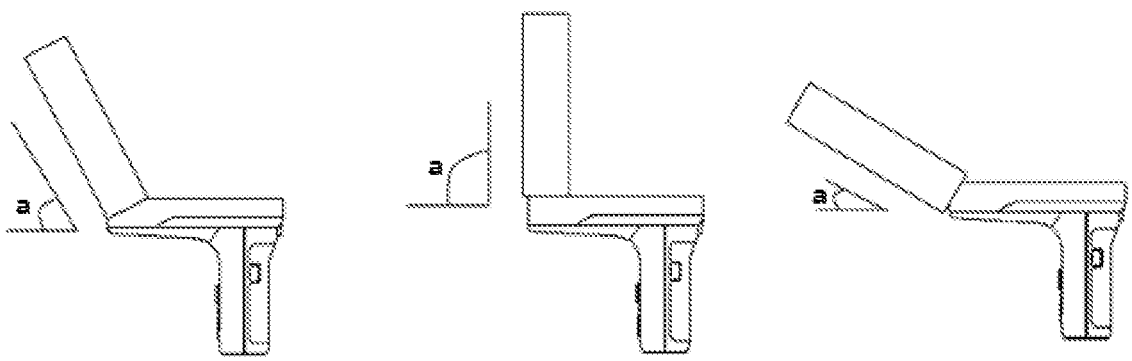
FIG. 7 is a structure diagram of a 7-shaped handle with an extension hand-held part with variable angle connected to the end of the handle according to the invention.

On the basis of the embodiment 1, as shown in FIG. 7, an included angle of 0-90 degree is formed between the axial direction of the end face of the movable connector 4 of the second connection arm 2 and an extending direction of the second connection arm 2, which will facilitate the user to operate after the extension devices is mounted on the movable connector.

Embodiment 7

Figure 6:
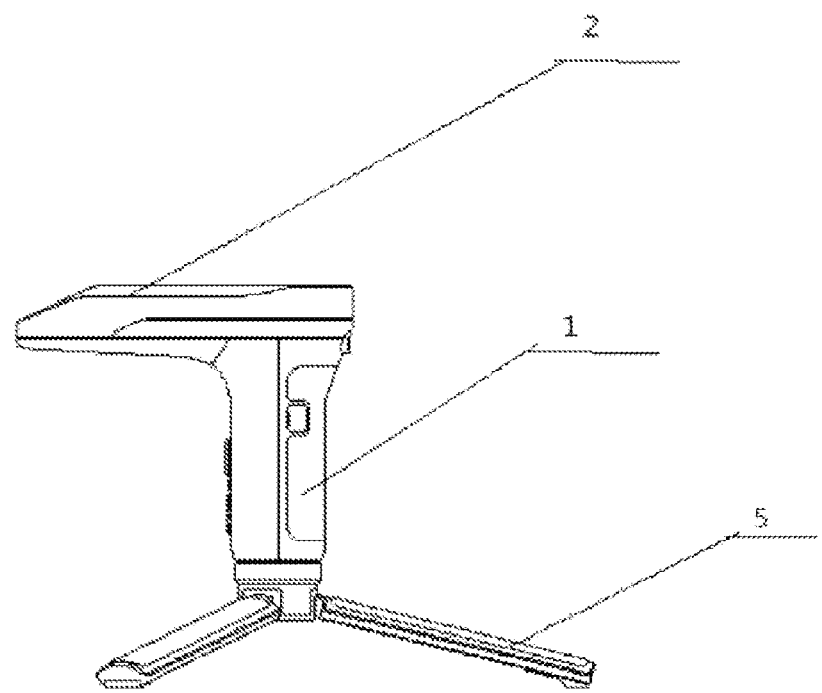
FIG. 6 is a structure diagram of a 7-shaped handle with an extension support connected to the end of the handle according to the present invention.

On the basis of embodiment 1, as shown in FIG. 6, the movable connector 2 is movably connected to the support 5. It is convenient for the user to place the gimbal together with the handle on the support 5.

Embodiment 8

On the basis of embodiment 1, as shown in FIGS. 4-6, the movable connection can be one of the bolt connection, the snap connection and the magnetic connection, and each of them is able to reach the goal of the present invention, i.e. making the extension part to be movably connected to the handle.

Embodiment 9

Figure 8:
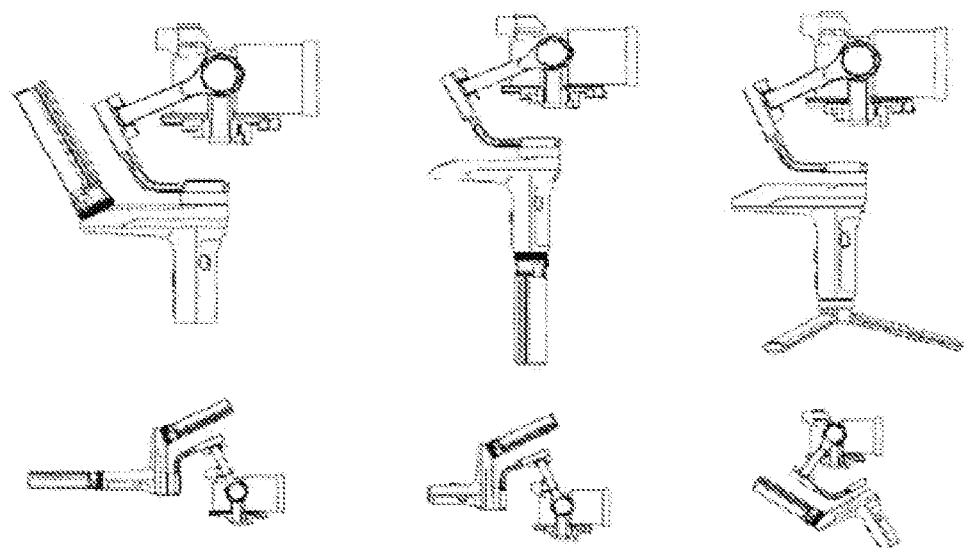
FIG. 8 is a diagram showing various application states of the 7-shaped handle according to the present invention.
Figure 9:
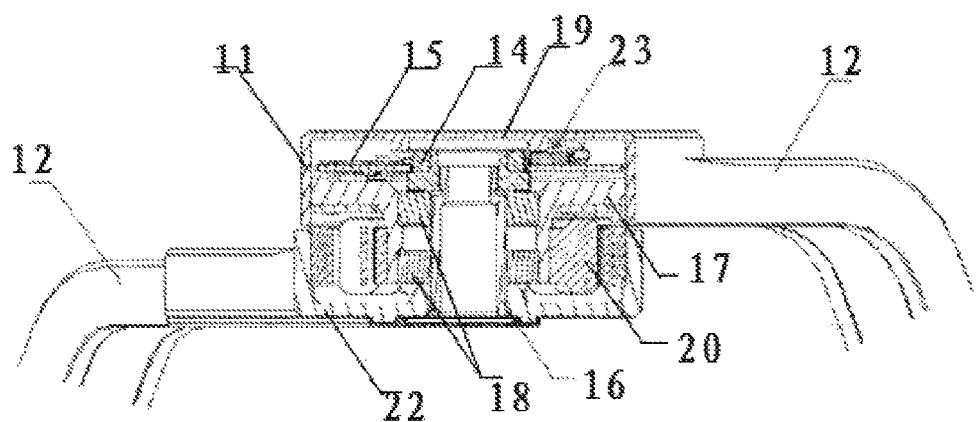
FIG. 9 is a schematic diagram of the construction of the motor for the stabilizer according to the present invention.

FIG. 8 shows the views of at least six different application modes can be realized by using the 7-shaped stabilizer handle of the present invention in combination with the gimbal camera, which can satisfy various photography experiences of the users.

Embodiment 10

On the basis of the above embodiments, the motor 11 includes a motor shaft 16, a magnet 14, a motor drive plate 15 and an encoder 23 arranged on the motor drive plate 15, in which the motor drive plate 15 and the encoder 23 are connected to motor end cover by means of bolts, the motor shaft 16 is connected to the motor housing, and the encoder 23 is arranged coaxial with the ring magnet 14, a gap is left between the encoder 23 and ring magnet 14, when being driven by the motor shaft 16, the ring magnet 14 will be rotated relative to the encoder 23, and the encoder 23 can be used to detect the rotation angle of the ring magnet 14. The thickness of the motor is the sum of the following parameters: the thickness of motor housing, the length of motor shaft, the thickness of ring magnet, the gap, the encoder, the thickness of motor drive plate, the height of nut and the thickness of motor end cover.

Embodiment 11

On the basis of the embodiment 10, the motor structure is shown in FIG. 2. The motor 11 includes a magnet 14, a motor drive plate 15, a motor shaft 16, an motor core carrier 17 and a bearing 18, in which one end of the motor core carrier 17 is detachably connected to a motor end cover 19 and the other end of the motor core carrier carries a motor core 20, the bearing 18 is fixed on the motor core carrier 17, the magnet 14 is sleeved on and rigidly connected to one end of the motor shaft 16, while the other end of motor shaft 16 is designed to pass through the bearing 18 and the motor core carrier 17 and is fixed to the motor housing 22. The magnet 14 is able to prevent the motor shaft displacing in the axial direction; the outer ring of the magnet 14 is sleeved onto the motor drive plate 15 and a gap is left between the magnet 14 and the motor drive plate 15, so that when the motor shaft 16 rotates, it will not drive the motor drive plate 15 to rotate therewith. Installing the motor drive plate 15 on the top of the magnet 14 in the prior art can be replaced with sleeving the motor drive plate 15 around the cylindrical surface of the magnet 14 The thickness of the motor 11 in this embodiment is the sum of the following parameters: the thickness of motor housing, the height of motor shaft, the thickness of magnet and the thickness of motor end cover, which has eliminated the sum of thickness of gap, the encoder, the thickness of motor drive plate and the height of nut in the prior art. Therefore, the thickness of the motor is greatly reduced without changing the power or other parameters of the motor 11.

In the above embodiment, the installation positions of the motor shaft 16 and the motor drive plate 15 are illustratively shown, but they can also be instead arranged at other positions according to other embodiments of the present invention. For example, one end of the motor shaft 16 is connected to the motor rotor and the other end thereof is connected to the magnet 14, meanwhile the motor drive plate 15 is connected to the motor stator. Alternatively, one end of the motor shaft 16 is connected to the motor stator and the other end thereof is connected to the magnet 14, meanwhile the motor drive plate 15 is connected to the motor rotor, et al. The above constructions can achieve the effect of reducing the thickness of the motor.

Embodiment 12

On the basis of embodiment 10, the end of the motor shaft 16 that sleeved with the magnet 14 is provided with a threaded connection locking structure, in order to prevent the motor shaft 16 from displacing in the axial direction when in operation, and the magnet 14 is nested on the motor shaft 16 by the locking structure in order to improve the stability of the stabilizer motor.

Embodiment 13

On the basis of embodiment 10, the motor drive plate 15 further includes an encoder 23, a median plane of the encoder 23 is coplanar with the median plane of the magnet 14, and the encoder 23 can collect the rotation angle of the magnet 14. The data detected by the encoder is more precious with the installation position of encoder according to this embodiment.

The above embodiments exemplarily show the installation position of the encoder 23 relative to the magnet 14. According to other embodiments of the present invention, the encoder 23 can be alternatively installed at other positions, for example, the encoder 23 can be located at the upper edge or the lower edge of the magnet 14.

Although the present invention has been described in detail with specific embodiments above, it is apparent to those skilled in the art that some modifications or improvements can be made on the basis of the present invention. Therefore, these modifications or improvements made without departing from the spirit of the invention belong to the scope of the invention.

The invention claimed is:

1. A lightweight hand-held stabilizer, comprising a gimbal and a 7-shaped handle, characterized in that the 7-shaped handle comprises a first connection arm and a second connection arm, one end of the first connection arm is rigidly connected with one end of the second connection arm, a gimbal connector is arranged at an end of the joint of the first connection arm and the second connection arm, and the first connection arm is used for being hand-held and control device is provided thereon; wherein the gimbal includes a loading stand, a connection arm and a motor, wherein the loading stand is connected to the motor by the connection arm, and the motor is fixed on the gimbal connector; wherein the motor includes a magnet, a motor drive plate and a motor shaft; the magnet is arranged on one end of the motor shaft, the motor drive plate is arranged around the magnet, and a gap is left between the magnet and the motor drive plate; wherein the motor drive plate is provided with an encoder, a median plane of which is coplanar with that of the magnet.

2. A lightweight hand-held stabilizer according to claim 1, characterized in that a movable connector is arranged on an end face of the other end of the first connection arm and/or the other end of the second connection arm.

3. A lightweight hand-held stabilizer according to claim 2, characterized in that the second connection arm is provided with a battery compartment.

4. A lightweight hand-held stabilizer according to claim 2, characterized in that an included angle of 60 to 120 degree is formed between the first connection arm and the second connection arm.

5. A lightweight hand-held stabilizer according to claim 2, characterized in that an included angle of 0 to 90 degree is formed between an axial direction of the end face of the other end of the second connection arm and the axial direction of the second connection arm.

6. A lightweight hand-held stabilizer according to claim 2, characterized in that the movable connector is designed to couple the handle of the stabilizer to a support or an extension hand-held part.

7. A lightweight hand-held stabilizer according to claim 6, characterized in that the movable connector is designed to be one of bolt connection, snap connection and magnetic connection.

* * * * *